US011817570B2

(12) United States Patent
Sadeghi et al.

(10) Patent No.: US 11,817,570 B2
(45) Date of Patent: Nov. 14, 2023

(54) METHOD OF MANUFACTURING A SOLID-STATE LITHIUM BATTERY AND A BATTERY MANUFACTURED BY THE METHOD

(71) Applicants: Ali Sadeghi, Atherton, CA (US); Yuri Vorobyev, San Carlos, CA (US); Gene Kristul, San Francisco, CA (US); Leonid Velikov, San Carlos, CA (US)

(72) Inventors: Ali Sadeghi, Atherton, CA (US); Yuri Vorobyev, San Carlos, CA (US); Gene Kristul, San Francisco, CA (US); Leonid Velikov, San Carlos, CA (US)

( * ) Notice: Subject to any disclaimer, the term of this patent is extended or adjusted under 35 U.S.C. 154(b) by 142 days.

(21) Appl. No.: 17/395,434

(22) Filed: Aug. 5, 2021

(65) Prior Publication Data

US 2023/0044416 A1    Feb. 9, 2023

(51) Int. Cl.
*H01M 10/058* (2010.01)
*H01M 10/0525* (2010.01)
*H01M 4/04* (2006.01)
*H01M 4/62* (2006.01)
*H01M 4/50* (2010.01)
*H01M 4/505* (2010.01)
(Continued)

(52) U.S. Cl.
CPC ......... *H01M 4/043* (2013.01); *H01M 4/0471* (2013.01); *H01M 10/058* (2013.01); *H01M 10/0525* (2013.01); *H01M 4/485* (2013.01); *H01M 4/505* (2013.01); *H01M 4/525* (2013.01); *H01M 4/623* (2013.01); *H01M 4/625* (2013.01); *H01M 2004/028* (2013.01)

(58) Field of Classification Search
CPC .... H01M 4/04; H01M 40/043; H01M 4/0471; H01M 10/0525; H01M 10/0528
See application file for complete search history.

(56) References Cited

U.S. PATENT DOCUMENTS 6,676,817 B2    1/2004 Noda et al.
9,246,188 B2    1/2016 Zhao et al.
(Continued)

FOREIGN PATENT DOCUMENTS

WO    WO2019129267    4/2019

OTHER PUBLICATIONS

Solid-State Batteries Advancing Toward Promise of Fast Changing, Long Life, Safer Use, Murray Slovick, Dec. 17, 2020, Siemens, Electronic Design.
(Continued)

*Primary Examiner* — Kenneth J Douyette

(57) ABSTRACT

The propose method of manufacturing a solid-state lithium battery consists of preparing an anode coated with a solid-state electrolyte precursor and a cathode unit coated with solid-state electrolyte, both precursors containing a predetermined amount of a redundant water. The thus prepared anode unit and cathode unit are pressed to each other through their respective electrolyte precursor layers in a closed chamber at a predetermined elevated temperature and under a predetermined mechanical pressure, whereby an integral pre-final solid-state battery unit is formed. The manufacture of the battery is completed by inserting the prefinal product into a casing that leaves parts of the metal current collectors of the prefinal product exposed for use as a battery anode and a battery cathode.

18 Claims, 5 Drawing Sheets

(51) Int. Cl.
 *H01M 4/525* (2010.01)
 *H01M 4/485* (2010.01)
 *H01M 4/02* (2006.01)

(56) References Cited

U.S. PATENT DOCUMENTS

| | | |
|---|---|---|
| 9,890,048 B2 | 2/2018 | Goodenough et al. |
| 10,446,845 B2 | 10/2019 | Goodenaugh et al. |
| 2009/0197182 A1* | 8/2009 | Katoh ............... H01M 10/052 429/231.5 |
| 2011/0177397 A1* | 7/2011 | Ogasa ................. C03C 3/062 29/623.1 |
| 2015/0162614 A1* | 6/2015 | Koshika ............... H01M 4/13 429/189 |
| 2017/0170515 A1 | 1/2017 | Yushin et al. |
| 2018/0277889 A1* | 9/2018 | Anandan ........... H01M 10/052 |
| 2021/0066747 A1* | 3/2021 | Bay .................. H01M 10/054 |

OTHER PUBLICATIONS

Braga, et al. Journal of Materials Chemistry, A, 2014, pp. 1-11.

* cited by examiner

METHOD OF MANUFACTURING A SOLID-STATE LITHIUM BATTERY AND A BATTERY MANUFACTURED BY THE METHOD

FIELD OF THE INVENTION

The present invention relates to the field of electric energy storage devices and, more particularly, to lithium batteries, specifically to lithium batteries that contain solid electrolytes. More specifically, the invention relates to a solid-state lithium battery and a method of manufacturing thereof.

DESCRIPTION OF PRIOR ART

A solid-state battery is a battery that uses solid electrodes and a solid electrolyte rather than the liquid or polymer gel electrolytes found in lithium ion or polymer lithium batteries. Recent developments in the field of solid-state batteries have revealed several components such as solid-state electrolytes that made it possible to significantly improve, as compared to previous solid-state batteries, such properties as safety, energy density, durability, sensitivity, and stability.

One of the promising trends in the development of solid-state electrolytes for lithium batteries is described in pending U.S. patent application Ser. No. 17/239,593 filed by Ali Sadeghi, et al. on Apr. 24, 2021, and entitled "A Solid-State Electrolyte for Lithium-Ion Battery and a Method of Synthesis thereof".

U.S. Pat. No. 10,446,845 issued on Oct. 15, 2019, to Goodenough, et al. discloses an electrochemical cell with a high voltage cathode. The aforementioned patent describes a rechargeable electrochemical cell that consists of an electrolyte side, a cathode side, and a polymer/plasticizer. The electrolyte side includes a solid glass electrolyte including an electrolyte mobile cation and electric dipoles, as well as an anode including a metal of the electrolyte mobile cation and contacting the solid glass electrolyte at an "anode/solid glass" electrolyte interface. The cathode side contains a cathode that includes a cathode active material into which a cathode guest cation is reversibly extracted/inserted. The cathode active material has a voltage versus lithium (Li) metal of between 3V and 15V. The polymer/plasticizer contacts the solid glass electrolyte at a solid glass "electrolyte: polymer/plasticizer" interface and the cathode at a "polymer/plasticizer: cathode" interface. As a result, the cathode guest cation is confined to the cathode side, and the electrolyte mobile cation is confined to the anode side during charge and discharge of the electrochemical cell.

Further improvement in the method of manufacturing a solid-state lithium battery is disclosed in the aforementioned pending U.S. patent application Ser. No. 17/239,593 filed by Ali Sadeghi, et al. on Apr. 24, 2021. The improved method is based on synthesizing a solid-state electrolyte of $Li_3HaIO$ formula for use in a lithium-ion battery. The method consists of uniformly mixing at least LiOH and LiHal in a stoichiometric quantity, heating the prepared mixture to a melting temperature and causing a reaction of formula ($2LiOH + LiHaI = Li_3HaIO + H_2O$) between the at least LiOH and LiHal in a process free of forming a perovskite structure and at a temperature, at which $H_2O$ that forms at the aforementioned reaction is converted into a bound form, whereby a reaction product is obtained. According to another modification of the method, prior to the stage of melting the mixture, a reinforcement mesh is immersed into the mixture, whereby after mixture is solidified, a solid-state electrolyte reinforced with the mixture embedded into its material is obtained.

SUMMARY OF THE INVENTION

The present invention relates to a method of manufacturing electrical energy-storing devices, in particular, to manufacturing solid-state lithium batteries, and to solid-state lithium batteries produced by the aforementioned method.

The propose method of manufacturing a solid-state lithium battery consists of an anode coated with a solid-state electrolyte precursor and a cathode unit coated with solid-state electrolyte, both precursors containing a predetermined amount of a redundant water. The thus prepared anode unit and cathode unit are pressed to each other through their respective electrolyte precursor layers in a closed chamber at a predetermined elevated temperature and under a predetermined mechanical pressure, whereby an integral pre-final solid-state battery unit is formed. The manufacture of the battery is completed by inserting the prefinal product into a casing that leaves parts of the metal current collectors of the prefinal product exposed for use as a battery anode and a battery cathode.

DETAILED DESCRIPTION OF THE INVENTION

According to the present invention, a method of manufacturing a lithium battery consists of three processes, two of which are carried out separately in parallel or in sequence for obtaining a precursor-coated anode unit and a precursor-coated cathode unit. The third process consists of assembling the obtained precursor-coated units to complete the manufacture of the target lithium battery.

Figure 1:
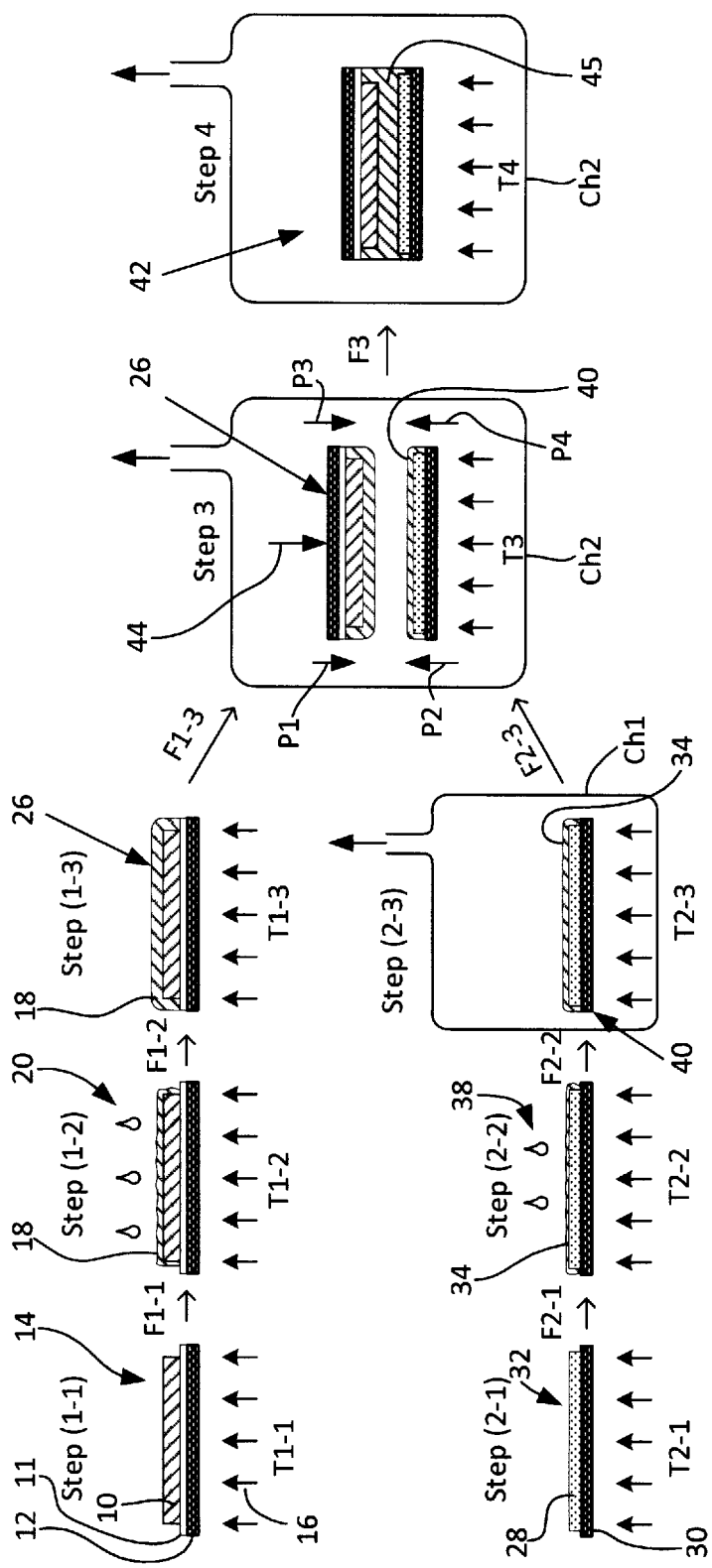
FIG. 1 is a flowchart of a lithium-battery manufacturing method according to one aspect of the present invention.
Figure 3:
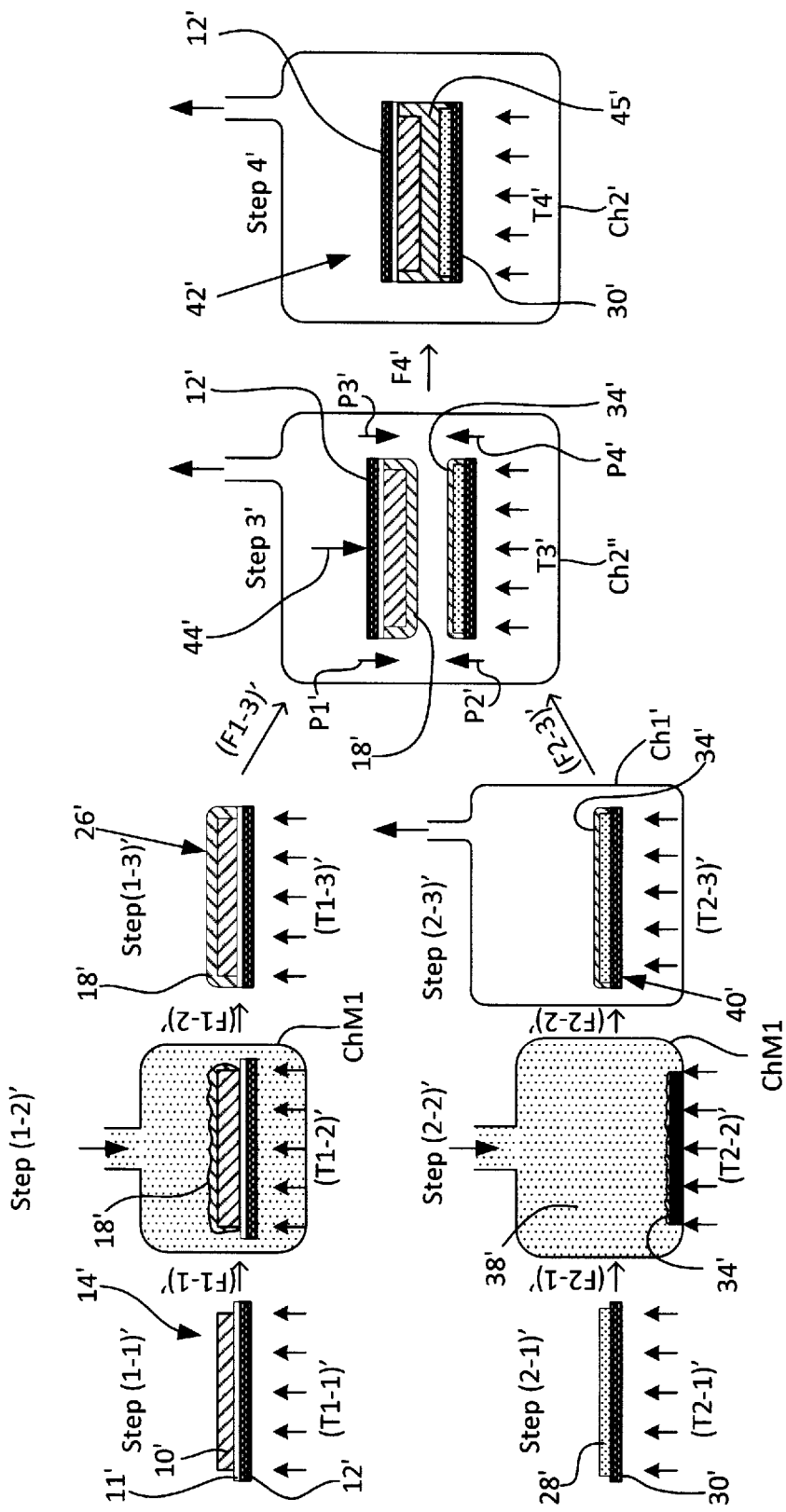
FIG. 3 is a lithium-battery manufacturing method according to a second aspect of the invention, wherein methods of supply of reaction reagents onto the heated surfaces of the lithium anode unit and cathode unit are different.

The first, second, and third processes will be further described with reference to the accompanying drawings, where FIG. 1 is a flowchart of a lithium-battery manufacturing method according to one aspect of the invention, and FIG. 3 is a lithium-battery manufacturing method according to a second aspect of the invention, both methods being identical and differs only by methods of supply of reagents to the surfaces of the anode unit and cathode unit.

The method of manufacturing a solid-state lithium battery (hereinafter referred to as a "Li-battery") consists of the following steps.

In a first process, which is shown in FIG. 1 in the form of sequential operations, the first step (Step 1-1) consists of providing a metal current collector 12, if necessary, one side of the metal current collector 12 is coated with a thin layer 11 of a conductive paste, and then a lithium-anode plate (Li-anode plate) 10 is placed onto the conductive paste layer 11. The conductive paste layer 11 fulfills two functions: 1) provides the best electrical conduction between the Li-anode plate 10 and the metal current collector 12; and 2) protects the contact surface of the Li-anode plate 10 from oxidation in subsequent battery manufacturing steps, i.e., Step (1-2), Step (1-3), and Step 3. The conductive paste layer 11 has a thickness in the range of 10 micron to 40 micron. Then, the metal current collector together with the Li anode plate and the layer 11 is heated to a working temperature, whereby a heated anode unit 14 is obtained.

Here and hereinafter, the heating processes are shown by arrows. In Step 1-1, the heating process is shown by arrows T1-1. The anode plate has a thickness in the range of tens of a micron to 0.5 mm. The current collector 12 is a metal plate or foil made of a material having high electric conductivity, such copper, aluminum, or stainless steel. The collector 12 has a thickness in the range of 20 microns to 100 microns. The anode plate 10 and the current collector 12 may have any suitable shape, e.g., a round shape with a diameter of conventional lithium batteries used in domestic appliances, instruments, TV remote controls, cameras, etc. Here and hereinafter, arrows designated by symbol F show transfer from sequential steps (F-1-1, F-1-2, and F1-3 for the first process, F2-1, F2-2, and F2-3 for the second process, and F3 for the third process). The heating processes are shown by upwardly directed arrows and are designated as T1-1, T1-2, T1-3 for the first process of the method, T2-1, T2-2, T2-3 for the second process of the method, T3 for the third process, and T4 for the fourth process.

In Step 1-2 of the first process, the Li-anode plate 10 of the heated anode unit 14 is wetted with a (LiCl+H$_2$0) solution, whereby, as a result of a reaction of formulas (1)

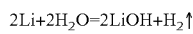

 (1)

a first solid-state electrolyte precursor 18 (here and hereinafter, the first SSE precursor) is formed on the heated anode unit.

The adsorption water (see formulas (1)) that is formed in the above reactions, is removed by thermal treatment at a temperature in the range of 90° C. to 130° C. Heat treatment at temperatures exceeding 130° C. leads to formation of non-uniform layers because of highly intensive emissions of gaseous hydrogen and water vapors (see reactions of formulas (1)).

Figure 2:
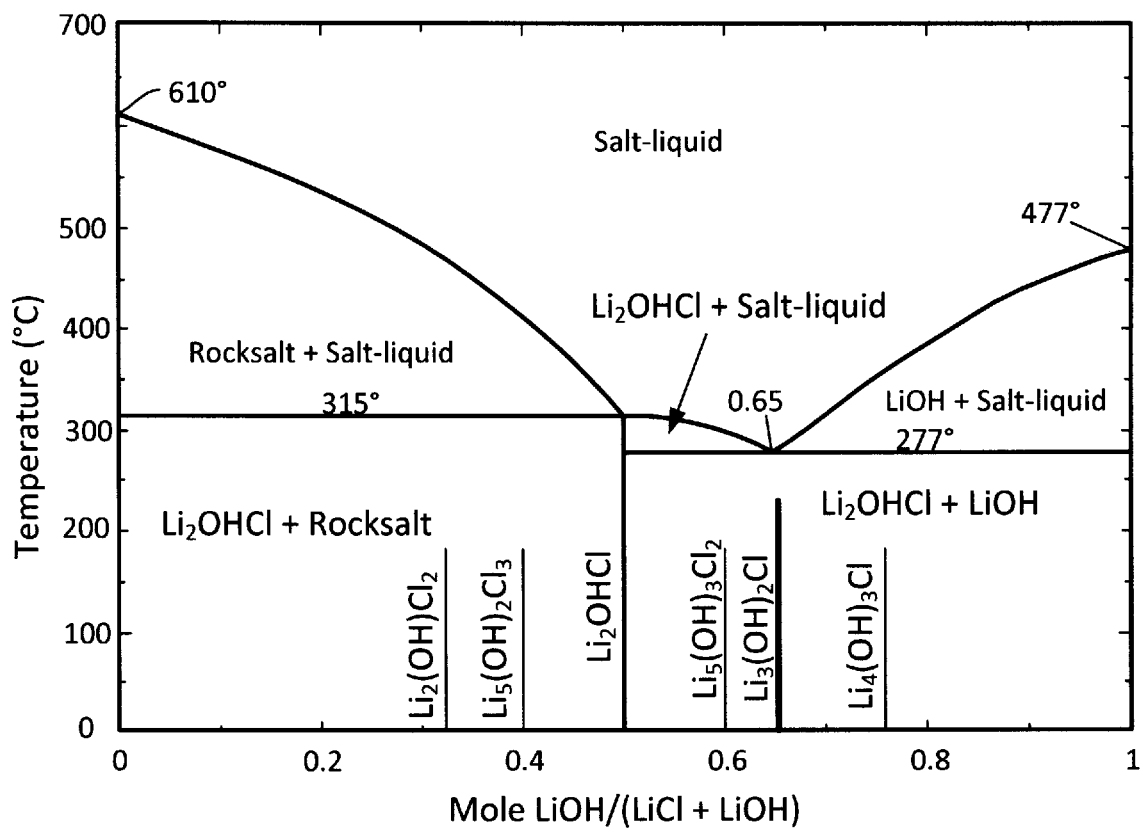
FIG. 2 is a phase diagram that shows products possibly formed in the reaction between lithium, LiCl and LiOH which are formed as a result of interaction with an aqueous solution of lithium chloride.

However, some trace amounts of crystalline water still remain in the compounds (Li$_2$(OH)Cl$_2$, Li$_5$(OH)$_2$Cl$_3$, Li$_2$(OH)$_2$Cl$_2$, Li$_5$(OH)$_3$Cl$_2$, Li$_3$(OH)$_2$Cl, Li$_4$(OH)$_3$Cl, which can be seen from the state diagram of FIG. 2. As can be seen from the same diagram of FIG. 2, these trace amounts of the crystalline water can be completely removed only at temperatures of 300° C. to 500° C. However, since the processes of the method of the invention are carried out at working temperatures of 90° C. to 130° C., they involve the formation of the aforementioned compounds through the entire thickness of the first SSE precursor 18, and the content of these compounds varies in the thickness direction of the precursor 18 depending on the concentration of lithium. As has been found by the inventors herein, in the method of the invention the crystalline water plays a prevailing role in the conductivity of the first SSE precursor 18.

According to the first aspect of the invention, wetting is carried out by dripping. In Step 2-1, the drops are designated by reference numeral 20. As mentioned above, the wetting process is accompanied by the formation of redundant water (the role of which was described above) and hydrogen-containing reaction products (see reactions (1)). Heating shown by arrows T2-1 is continued. The heating time is within the range of 5 to 15 min. The aqueous (LiCl+H$_2$O) solution may have different concentrations of LiCl up to or about 83 wt. %. The reaction that takes place on the lithium surface between the lithium and the solution also is accompanied by intensive emission of gaseous hydrogen and a redundant water vapors that do not participate in the reaction. The heating temperature on the lithium surface during the reaction is in range of 90° C. to 130° C.

One of the reaction products is Li$_3$ClO. More specifically, L$_3$ClO is formed as a result of the same reaction as one shown by formulas (1).

Removal of reaction products should be made under a pressure below the atmospheric and in the atmosphere of an inert gas, e.g., argon. Step 1-3 is removing extraneous and redundant H$_2$O bonded products and H$_2$-reaction products. Heating shown by arrows T3-1 is continued. The main problem in conducting the aforementioned reaction is removal of free water and retaining it in the hydroxyl form, as well as removal of H$_2$. Free water is left in a trace amount. However, the removal of H$_2$ at temperatures exceeding 130° C. may result in non-uniformity in the newly formed surface layer, i.e., the first SSE precursor 18. In reality, the first SSE precursor 18 will also contain all compounds shown in the state diagram of FIG. 2. As a result, a precursor-covered lithium anode unit 26 is obtained. Heating is still maintained.

The following is a description of the second process of the Li-battery manufacturing method. The second process is manufacturing of a battery cathode unit. The process consists of Steps 2-1, 2-2, and 2-3, which can be performed in parallel with or independently from the first process.

Step 2-1 is pressure forming of a cathode plate 28 from a compressed mixture of cathode-material powder and placing the obtained cathode plate 28 on a metal current collector 30, whereby a cathode unit 32 is obtained. The obtained cathode unit 32 is heated to a temperature in the range of 90° C. to 130° C.

Although in the subsequent description the active component of the compressed mixture of cathode-material powder is exemplified by MnO$_2$, other oxides such as LiMn$_2$O$_4$, LiCoO$_2$, LiFePO$_4$, Li$_4$Ti$_5$O$_{12}$, LiNi$_{0.5}$Mn$_{1.5}$O$_4$, or the like also can be used, e.g., in the form of oxide particles bounded with carbon particles. for improving conductivity of the cathode plate.

The heating process is shown by arrows T2-1. The powder mixture is a mixture of, e.g., a finely dispersed MnO$_2$ powder in an amount, e.g., up to 92 wt %, with a polyfluorotetraethylene (PTFE), e.g., in an amount of 5 wt. %, and finely dispersed carbon powder, e.g., in an amount of 3 wt %. Although the above composition and component ration of the powder mixture are those normally used in the manufacture of standard batteries, they are given only as examples, and a lot of other compositions and component ratios can be used for the purposes of the present invention.

The cathode plate 28 is formed from the powder under pressure, e.g., in the range up to 3000 kg/cm$^2$, whereby the cathode plate, which normally has a thickness of 0.5 mm to 3 mm is obtained. The diameter of the cathode plate 28 is the same as the diameter of the lithium anode plate 16. The cathode plate 28 is formed on the current collector plate 30 with a tight electrical contact, which is enhanced in the aforementioned pressure-forming operation.

In the next Step 2-2, the obtained cathode unit 32 is maintained under an elevated temperature in the range of 90° C. to 130° C. and is subjected to wetting of the cathode plate 28 with a (LiCl+H$_2$0) solution, whereby a second SSE precursor, e.g., a precursor 34 is formed. A specific heating time at Step 2-2, as well as at other heating processes, depends on many production parameters such as thickness of the precursors to be formed, concentration of solutions, etc., but, in general, the time lasts from 5 min to 15 min. The second SSE precursor 34 has a thickness in the range, e.g., of 20 microns to 150 microns. This range is given as an example, and the precursor 34 may be thicker than 150 microns.

The wetting operation is dripping, where in Step T2-2 drops are designated by reference numeral 38. The heating process in Step 2-3 is carried out in a close space of a chamber Ch1. The heating is performed under low pressure of 50 to 250 mTorr until complete removal of reaction emission products generated in the chamber Ch1 in Step 2-3 is achieved. The heating is continued until the content of moisture in the precursor 34 is reduced to a predetermined level at which a certain amount of free water remains. This is achieved by controlling the time and pressure at Step F2-3 in the chamber Ch1). The parameters of the processes that occur in the chamber Ch1 are given as examples. Then, thus obtained a precursor-covered cathode unit 40 is transferred to Step 3 (cathode-anode assembling operation It is assumed, that Step F2-3 occurs simultaneously or after Step F1-3 (transfer of the precursor-coated anode unit 26 to assembling Step 3) provided that the anode unit 26 remains in a heated state.

Upon completion of the first and second processes according to the first aspect of the invention, a third Li-battery manufacturing process begins. The third process consists essentially of two steps, i.e., Step 3 and Step 4, which are conducted in a chamber Ch2. The chamber Ch2 is provided with devices that allow to maintain the interior of the chamber under a predetermined pressure and an elevated temperature. The chamber Ch2 is equipped with a mechanical press (which is not shown in FIG. 1 but the presence of which is shown by arrow 44). The mechanical pressure developed in the chamber Ch2 may reach a value of 1000 kg/cm$^2$.

In Step 3, the precursor-covered lithium anode unit 26, obtained in the first process of the method is flipped over by 180° and placed onto the precursor-covered cathode unit 40. This action is shown by arrows F1-3 and F2-3. Thus, the surface of the precursor-covered lithium anode unit 26 is placed into contact with the wet surface of the second SSE precursor 34 of the precursor-covered cathode unit 40. During assembling, the heating shown by arrows T3 is continued. Arrows P1, P2, P3 and P4 show approaching of the precursor-coated Li-anode unit 26 toward the precursor-coated cathode unit 40.

As a result, a pre-final solid-state battery unit 42 is obtained (FIG. 1). The transfer from Step F1-3 to Step 3 is shown by arrow F3. Arrow 44 shows application of the lithium unit 26 onto the cathode unit 40 under a high mechanical pressure, e.g., of about 1000 kg/cm$^2$. However, a caution is needed to limit the pressure to a value at which the lithium tablet is not deformed or destroyed.

The extraneous reaction products such as water, residual solution, etc., are removed from the chamber Ch2. During assembling, temperature of the process is maintained in the range of 90° C. to 130° C., and an interior pressure in the chamber Ch2 is reduced below the atmospheric to a level, e.g., below 100 mTorr. After interaction of the first SSE precursor 18 with the second SSE precursor 34, an integral solid-state electrolyte 45 is formed.

Upon completion of the assembling, extraneous gaseous products are removed from the surfaces of the pre-final solid-state battery unit 42. The latter is still maintained in a heated state for protecting its surfaces from interaction with atmospheric moisture. Alternatively, the unit 42 is retained in the atmosphere of an inert gas and under a pressure below the atmospheric. After release of the pressure, the pre-final solid-state battery unit 42 is still maintained in the chamber Ch2 for a certain time under low internal pressure of about 100 mTorr and under the elevated temperature of, e.g., 90° C. Following this, the pressure is increased to the atmospheric and the temperature is reduced to room temperature.

The method of the invention according to the second aspect will now be described with reference to FIG. 3. In general, the method of the second aspect of the invention is similar to the method described with reference to FIGS. 1 and 2. Therefore, the steps, components, and operations of the second modification of the method are designated with the same reference numerals and symbols, which are identical to those of the first modification, but with an addition of a prime, i.e., the first step is designated as Step (1-1)', the Li-anode plate is designated by reference numeral 10', the collector plate is designated by reference numeral 12', etc. Thus, the second solid SSE precursor will be designated by reference numeral 18' and the integral solid-state electrolyte by reference numeral 45'. In Step (1-3)", reference numeral CHM2a designates a closed chamber for drying the precursor 26" at a predetermined pressure and temperature to a predetermined content of water in the precursor 26'.

Upon completion of the assembling, extraneous gaseous products are removed from the surfaces of a pre-final solid-state battery unit 42'.

The main distinction of the method according to the second aspect from the first one resides in the operation of wetting of the Li-anode plate 10' of the heated anode unit 14' with a (LiCl+H$_2$O) solution for the formation of the first SSE precursor 18' on the surface of the lithium anode plate 10'. According to the second aspect of the invention, wetting is carried out by placing the unit into the solution medium, which is delivered in the form of a mist designated by reference numeral 20'. Formation of the mist 20' and wetting of the of the Li-anode plate 10' are performed in a confined space of the closed chamber ChM1a for wetting of the anode plate 10' in Step (1-2)', and in a confined space of the closed chamber ChM1b for wetting of the cathode plate 28' in Step (2-2)'. The closed chambers are needed for maintaining the wetting process at predetermined temperature and pressure. Heating during assembling under mechanical pressure in a chamber Ch2 is accompanied by the formation of an integral solid-state electrolyte 45'.

Upon completion of the assembling, extraneous gaseous products are removed from the surfaces of the pre-final solid-state battery unit 42'. The latter is still maintained in a heated state for protecting the surfaces of semi-product from interaction with atmospheric moisture. Alternatively, the pre-final solid-state battery unit 42' is retained in the atmosphere of inert gas.

Figure 4:
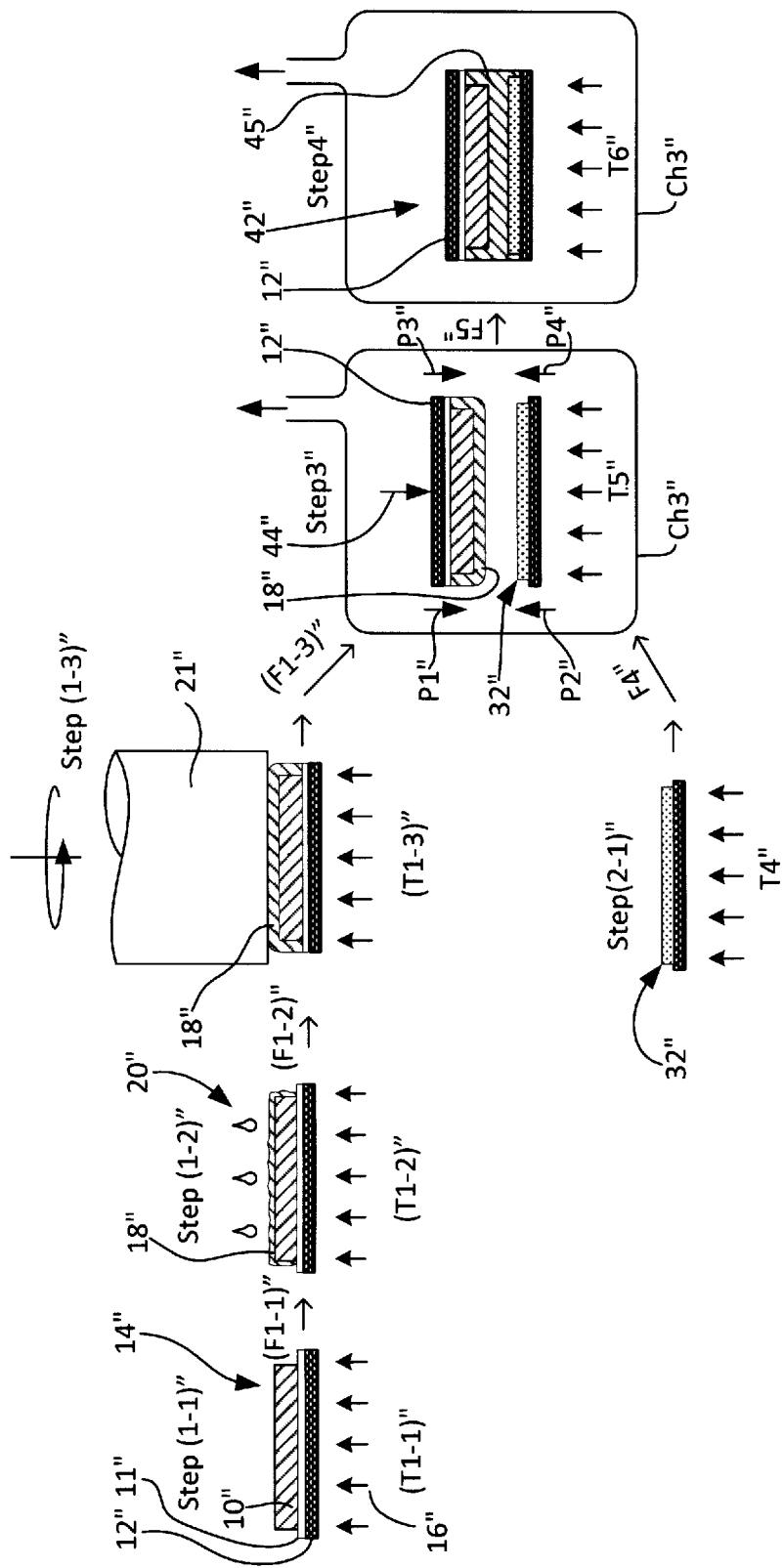
FIG. 4 is a flowchart that shows a sequence of battery manufacturing operations in accordance with a modified version of the first process shown in FIG. 1.

FIG. 4 shows a sequence of battery manufacturing operations in accordance with a modified version of the first process, which is shown in FIG. 1. According to this aspect of the invention, the units, and steps, which are identical to those shown in FIG. 1 in connection with the previous first process, are designated with the same reference numeral and symbols but with an addition of two primes. For example, Step (1-1) is designated as Step (1-1)", Step (1-2) is designated as Step (1-2)", etc. However, the method of the modified version of FIG. 4 differs from one shown in FIG. 1 by the omissions of Steps (2-2) and (2-3). This means that the cathode-collector unit 32" is transferred directly to Step 3". However, the unit 32" is formed under different temperature-time conditions. More specifically, for the formation of the integral solid-state electrolyte 45" in subsequent Step 4" with both layers combined into an integral structure, the heating time of T(2-1)" process is extended by about 15-25% as compared to the time of T(2-1) of the previous battery manufacturing process. In order not to violate the structure in the formed layers, the heating temperature should be in the range of 90° C. to 130° C., and the time of the process is selected depending on such a parameter as a desirable thickness of the integral solid-state electrolyte 45" obtained in Step 4".

In order to provide reliable contact between the surfaces of cathode-collector unit 32" and the first SSE precursor 18" of the heated anode unit" 14", the surface of the first SSE precursor 18" is polished, e.g., with a rotary polishing tool 21".

As mentioned above, upon completion of the assembling a pre-final solid-state battery unit 42" (as well as pre-final solid-state battery units 42 and 42'), extraneous gaseous products are removed from the surfaces of the pre-final solid-state battery unit 42" (FIG. 4). The latter is still maintained in a heated state for protecting the surfaces of the pre-final solid-state battery unit 42" from interaction with atmospheric moisture. Next, the pre-final solid-state battery unit is transferred to the battery completion operation.

Figure 5:
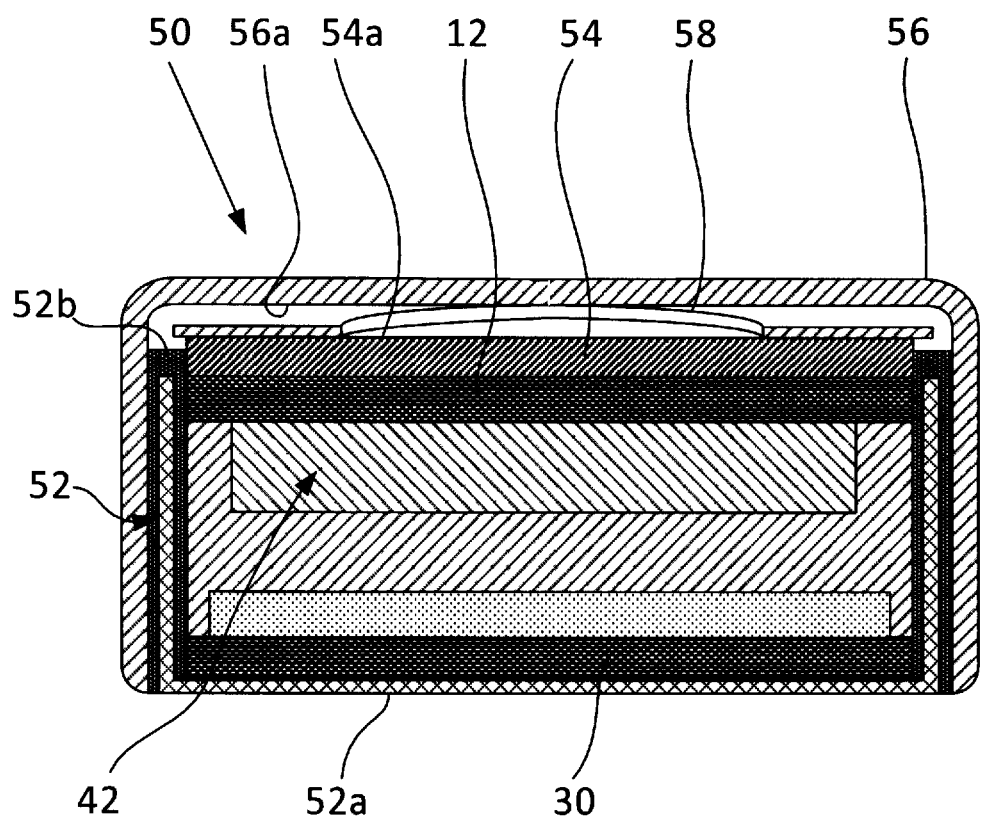
FIG. 5 is a vertical sectional view of a lithium battery produced by the method of the present invention in accordance with the first, second, and third aspects of the invention.

FIG. 5 is a vertical sectional view of a solid-state lithium battery 50 produced by the method of the present invention in accordance with the first, second, and third aspects of invention. The solid-state lithium battery 50 consists of the pre-final solid-state battery unit 42 (42' and 42"), which is inserted into a cup-shaped casing 52 that has a current-conducting bottom 52a and electrically isolated or non-conductive side wall 52b. The current collector 12 of the anode unit 26 (FIG. 1) is coated with a metal spacer plate 54. The cup-shaped casing 52 with the inserted pre-final solid-state battery unit 42 is covered with a cup-shaped external casing 56 made of an electrically conductive material, which is fitted onto the non-conductive side wall 52b, e.g., with a press fit, and a metallic Belleville spring 58 is placed between the bottom 56a of the cup-shaped external casing 56 and the upper surface 54a of the metal spacer plate 54. The current-conducting bottom 52a is maintained in electrical contact with the metal electrical current collector 30 (FIGS. 1 and 5). The spring 58 is used for maintaining a reliable contact between the current conducting parts of the battery. The lithium battery 50 of the present invention is shown as a coin-type battery only as an example, but in any case, the final battery of the invention may have a shape and overall dimensions of any standard battery. For example, the batteries of the invention may have dimensions specified by the International Electrotechnical Commission (IEC) and American National Standards Institute (ANSI).

The invention was described and illustrated with reference to specific drawings. It is understood, however, that the description and the illustrated modifications should not be construed as limiting the scope of the invention and that any changes are possible provided that do not depart from the scope of the attached claims. For example, the use of the metal spacer is optional and the spring 58 may be in contact directly with the current collector 12 of the anode unit 26.

The method is applicable to manufacturing solid-state cathodes of any types for use in non-chargeable or rechargeable batteries.

The invention claimed is:

1. A method of manufacturing a solid-state lithium battery comprising steps of:
    (a) providing a lithium-anode unit comprising on one side a first solid-state electrolyte precursor having a surface and a first metal current collector on a side opposite to said one side, the first solid-state electrolyte precursor containing redundant water;
    (b) providing a cathode unit, which has on one side a cathode plate comprising a compressed mixture of cathode-material powder and on a side, which is opposite to said one side of the cathode unit, a second metal current collector;
    (c) placing the lithium-anode unit onto the cathode unit by contacting the first solid-state electrolyte precursor with the cathode plate;
    (d) pressing the anode unit to the cathode unit under a pressure in a range of 400 kg/cm$^2$ to 1000 kg/cm$^2$ with heating at a temperature in a range of 90° C. to 130° C. to remove the redundant water and form a pre-final solid-state battery unit comprising an anode unit, a cathode unit, and a solid-state electrolyte formed between them at least from the first solid-state electrolyte precursor; and
    (e) forming the solid-state lithium battery by inserting the pre-final solid-state battery unit into a battery casing, wherein the lithium-anode unit and the cathode unit are interconnected through the solid-state electrolyte unit and wherein the first metal current collector and the second metal current collector are at least partially exposed from the battery casing for use as a battery anode and a battery cathode, respectively.

2. The method of claim 1, further comprising a step of forming a second electrolyte precursor as a result of a first wetting process by dripping a solution of at least of LiCl and H$_2$O, onto the compressed mixture of the cathode-material powder thus causing a chemical reaction between at least LiCl and H$_2$O, wherein the reaction is carried out at a temperature in a range of 90° C. to 130° C., wherein in step (d), the first solid-state electrolyte precursor and the second solid-state electrolyte precursor together form an integral solid-state electrolyte of the solid-state lithium battery.

3. The method of claim 1, further comprising a step of forming a second electrolyte precursor as a result of a second wetting process by placing the cathode unit into a solution of at least of LiCl and H$_2$O, which is delivered to the cathode plate in a form of a mist, in a confined space of a first closed chamber to cause a chemical reaction between at least LiCl and H$_2$O, wherein the reaction is carried out at a temperature in a range of 90° C. to 130° C., wherein in step (d), the first solid-state electrolyte precursor and the second solid-state electrolyte precursor form an integral solid-state electrolyte of the solid-state lithium battery.

4. The method of claim 1, further comprising a step of polishing, prior to step (c), the surface of the first electrolyte precursor.

5. The method of claim 1, wherein the anode unit comprises a lithium anode plate which contains lithium, and on which the first solid-state electrolyte precursor is formed in a first wetting process by wetting the lithium anode plate with a (LiCl+H$_2$O) solution added by dripping thus causing a chemical reaction of the following formulas:

$$2Li + 2H_2O = 2LiOH + H_2\uparrow \text{ and } 2LiOH + LiCl = H_2O\uparrow + Li_3ClO$$

the reaction of formulas (1) being carried out with heating at a temperature in a range of 90° C. to 130° C.

6. The method of claim 2, wherein the anode unit comprises a lithium anode plate which contains lithium, and on which the first solid-state electrolyte precursor is formed in a first wetting process by wetting the lithium anode plate with a (LiCl+$H_2$O) solution added by dripping thus causing a chemical reaction of the following formula:

$$2Li+2H_2O=2LiOH+H_2\uparrow \text{ and } 2LiOH+LiCl=H_2O\uparrow + Li_3ClO \quad (1),$$

the reaction of formula (1) being carried out with heating at a temperature in a range of 90° C. to 130° C.

7. The method of claim 3 wherein the anode unit comprises a lithium anode plate which contains lithium, and on which the first solid-state electrolyte precursor is formed in a first wetting process by wetting the lithium anode plate with a (LiCl+$H_2$O) solution added by dripping thus causing a chemical reaction of the following formulas:

$$2Li+2H_2O=2LiOH+H_2\uparrow \text{ and } 2LiOH+LiCl=H_2O\uparrow + Li_3ClO \quad (1),$$

the reaction of formula (1) being carried out with heating at a temperature in a range of 90° C. to 130° C.

8. The method of claim 1, wherein the compressed mixture of cathode-material powder is a mixture of a metal oxide selected from the group consisting of $MnO_2$, $LiMn_2O_4$, $LiCoO_2$, $LiFePO_4$, $Li_4Ti_5O_{12}$, and $LiNi_{0.5}Mn_{1.5}O$ in an amount in a range of 88 wt % to 94 wt %, a polyfluorotetraethylene in an amount of 3 wt % to 6 wt %, and a carbon powder in an amount of 1 wt % to 6 wt %.

9. The method of claim 2, wherein the compressed mixture of cathode-material powder is a mixture of a metal oxide selected from the group consisting of $MnO_2$, $LiMn_2O_4$, $LiCoO_2$, $LiFePO_4$, $Li_4Ti_5O_{12}$, and $LiNi_{0.5}Mn_{1.5}O$ in an amount in a range of 88 wt % to 94 wt %, a polyfluorotetraethylene in an amount of 3 wt % to 6 wt %, and a carbon powder in an amount of 1 wt % to 6 wt %.

10. The method of claim 3, wherein the compressed mixture of cathode-material powder is a mixture of a metal oxide selected from the group consisting of $MnO_2$, $LiMn_2O_4$, $LiCoO_2$, $LiFePO_4$, $Li_4Ti_5O_{12}$, and $LiNi_{0.5}Mn_{1.5}O$ in an amount in a range of 88 wt % to 94 wt %, a polyfluorotetraethylene in an amount of 3 wt % to 6 wt %, and a carbon powder in an amount of 1 wt % to 6 wt %.

11. The method of claim 4, wherein the compressed mixture of cathode-material powder is a mixture of a metal oxide selected from the group consisting of $MnO_2$, $LiMn_2O_4$, $LiCoO_2$, $LiFePO_4$, $Li_4Ti_5O_{12}$, and $LiNi_{0.5}Mn_{1.5}O$ in an amount in a range of 88 wt % to 94 wt %, a polyfluorotetraethylene in an amount of 3 wt % to 6 wt %, and a carbon powder in an amount of 1 wt % to 6 wt %.

12. The method of claim 2, wherein the heating is carried out in a second closed chamber under a predetermined pressure below atmospheric pressure and at an elevated temperature for bringing the first solid-state electrolyte precursor to a predetermined content of the redundant water.

13. The method of claim 3, wherein the heating is carried out in a second closed chamber under a predetermined pressure below atmospheric pressure and at an elevated temperature for bringing the first solid-state electrolyte precursor to a predetermined content of the redundant water.

14. The method of claim 6 wherein the heating is carried out in a second closed chamber under a predetermined pressure below atmospheric pressure and at an elevated temperature for bringing the first solid-state electrolyte precursor to a predetermined content of the redundant water.

15. The method of claim 7 wherein the heating is carried out in a second closed chamber under a predetermined pressure below atmospheric pressure and at an elevated temperature for bringing the first solid-state electrolyte precursor to a predetermined content of the redundant water.

16. The method of claim 12, wherein step (d) is carried out in the second closed chamber.

17. The method of claim 5, wherein, prior to formation of the first solid-state electrolyte precursor on the lithium anode plate, a layer of a conductive paste is placed onto the lithium anode plate.

18. The method of claim 6, wherein, prior to formation of the first solid-state electrolyte precursor on the lithium anode plate, a layer of a conductive paste is placed onto the lithium anode plate.

* * * * *